(12) United States Patent
Glauber

(10) Patent No.: US 10,788,296 B2
(45) Date of Patent: *Sep. 29, 2020

(54) SHOOTING SIMULATOR WITH GPS AND AUGMENTED REALITY

(71) Applicant: Joel Glauber, Monroe, NY (US)

(72) Inventor: Joel Glauber, Monroe, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/887,215

(22) Filed: Feb. 2, 2018

(65) Prior Publication Data

US 2018/0156580 A1    Jun. 7, 2018

Related U.S. Application Data

(63) Continuation of application No. 15/286,666, filed on Oct. 6, 2016, now Pat. No. 9,939,234.

(51) Int. Cl.
*G08B 21/00* (2006.01)
*F41J 5/14* (2006.01)
*G01S 19/13* (2010.01)
*G01S 19/14* (2010.01)

(52) U.S. Cl.
CPC ............... *F41J 5/14* (2013.01); *G01S 19/13* (2013.01); *G01S 19/14* (2013.01)

(58) Field of Classification Search
None
See application file for complete search history.

(56) References Cited

U.S. PATENT DOCUMENTS

2012/0329538 A1* 12/2012 Hall .................. A63F 13/12
                                                                   463/2
2017/0216728 A1*  8/2017 Logan ............... A63F 13/213

* cited by examiner

*Primary Examiner* — Adolf Dsouza
(74) *Attorney, Agent, or Firm* — Michael Feigin, Esq.; Feigin & Fridman

(57) ABSTRACT

A real-life target is hit with a virtual bullet or projectile using GPS-enabled or otherwise location aware devices which report their location. Real world information is taken into account, such as the terrain, elevation, weather, and line of sight, to determine if the virtual bullet hits the real-life target. Virtual information is also taken into account, such as which weapon is selected and what its distance and accuracy are. Further, information about the shooter is taken into account, such as his/her accuracy, how tired he/she is (based on recent travel distance and velocity), and how steady the GPS-enabled device is being held.

11 Claims, 4 Drawing Sheets

SHOOTING SIMULATOR WITH GPS AND AUGMENTED REALITY

FIELD OF THE DISCLOSED TECHNOLOGY

The disclosed technology relates generally to global positioning systems and augmented reality and, more specifically, to using same to fire accurate virtual shots at targets.

BACKGROUND OF THE DISCLOSED TECHNOLOGY

Back in the 1980s, children played laser tag types of games by wearing an infrared receiver and holding an infrared gun. One person would shoot at another, and if your gun's infrared signal hit your opponent's infrared receiver, you scored a hit.

More recently, this type of shooting and being hit has been updated, using augmented reality. One can shoot digital versions of others displayed on a screen, which partially includes real video. For example, U.S. Pat. No. 9,132,342, assigned to Sulon Technologies Inc., discloses a screen and sensors on a person who carries a toy gun. Players then try and shoot each other, using this GPS-enabled system. Others, such as WO 2016/02060, assigned to SmartLab PTE Ltd., disclose a more direction combination of laser tag and GPS positioning. Infrared beams are used to transmit and receive shots, and hits are displayed.

Still, further improvements are needed to make the games more realistic and take them from the level of a game to a more sophisticated simulation that can be used for real-world training, minus the actual guns and weapons.

SUMMARY OF THE DISCLOSED TECHNOLOGY

A real-life target is hit with a virtual bullet or projectile, using GPS-enabled or other location aware devices which report their location. Real world information is taken into account, such as the terrain, elevation, weather, and line of sight, to determine if the virtual bullet hits the real-life target. Virtual information is also taken into account, such as which weapon is selected and what its distance and accuracy are. Further, information about the shooter is taken into account, such as his/her accuracy, how tired he/she is (based on recent travel distance and velocity), and how steady the GPS-enabled device is being held. Thus, a simulation which mirrors reality is made, allowing people to play a more realistic type of a virtual action with each other.

The above can be carried out as follows. A first packet-switched network receives location information determined by a GPS receiver on a device operated by a shooter. A second packet-switched network receives location information determined by a GPS receiver on a device operated by a target. Map data comprising both real and man-made terrain elements are further determined or read. "Real terrain" refers to natural terrain, such as mountains, valleys, elevation changes, and trees. "Man-made terrain" refers to buildings, posts, and other constructed objects which rise above the surface of the earth. Data is received from the device operated by the shooter, indicating that a shot has been fired.

Then a probability of the shooter hitting the target with the shot is determined. This determination is, in some embodiments, based on whether the target is in a line of sight to the shooter and a distance between the shooter and the target, the distance calculated from the location information received from the device operated by the shooter and the device operated by the target. A notification to the device operated by the shooter and/or the device operated by the target of a closest distance that the shot came to the location of the device operated by the target can be sent. In other words, the shooter or target can be notified as to how close they came to hitting, or being hit by, the virtual bullet.

A "shot" or "virtual bullet" is a weapon which causes damage to an avatar or character played in the simulation, upon hitting such an avatar or character. The shot or virtual bullet trajectory, distance traveled, and damaging power are determined, based, in part, on real-world information at the time of the shot. More specifically, items which determine where the shot goes and how much damage it can do can include an angle of the device operated by the shooter at the time the shot is made. Such an angle can be outputted by an accelerometer in the device of the shooter. Orientation of the device operated by the shooter (determined based on output by the accelerometer, compass or GPS receiver in the device) can also be used to determine trajectory, probability of hit, and other attributes of the bullet. A range and accuracy of a weapon selected for said shot can also be taken into account, the weapon being a virtual representation of a real weapon, such as having the same name as a real weapon. Real-time precipitation and/or wind conditions and/or barometric pressure reported near a location of one of the devices operated by the shooter, and the device operated by the target, can also be taken into account. For purposes of this disclosure, "near" is defined as "a one of a closest or closest reporting weather station or device outputting the information used to adjust probability of a shot" or "within 10 kilometers" or "a regional location selected by an operator of the simulation."

Jitter (how much the device is shaking at a time of shot or a time period before the shot is made) of the device operated by the shooter can also be used to account for accuracy of a shot and, therefore, probability of a hit on a target. A pre-determined shooting accuracy of the shooter, such as by way of determining accuracy in a shooting range (real or virtual, using, for example, the device of the shooter) can be taken into account to modify the probability that the shooter will hit the target. A difference in elevation between the shooter and target can also be taken into account, such as giving a higher probability of hit when shooting at a negative angle rather than at a positive angle, relative to the ground.

A system for determining whether a target has been hit, in embodiments of the disclosed technology, receives an indication of location of a device operated by a shooter and a device operated by a target, as reported by a GPS receiver on each respective device. Weather information near said location of the device operated by the shooter is further received, having at least two of present precipitation conditions, temperature, and barometric pressure. Map data with elevation of solid objects between the device operated by the shooter and the device operated by the target can also be taken into account. Angle data of the device operated by the shooter at a time when the device indicates that a shot has been fired is used, in embodiments, to determine the trajectory of a virtual object. Then, based on treating the virtual bullet as a real object shot from the device of the shooter (using one, some, or all of the location of the devices, the weather information, the map data, and the angle data) a probability of the virtual object hitting the target is determined and/or calculated. In some embodiments, hit or miss data are displayed on the device operated by the shooter, letting him know if the target has been hit.

In some cases, a determination is made that the device operated by the target does not have a line of sight to the target (direct or with a trajectory of the bullet, such as with an upward angle or "lob" thereof). Thus, a determination that the virtual object has a zero probability of hitting the target might be made in such an instance. A closest distance that a shot (including damage from a shot which would indicate a partial or full hit) came to a target can be displayed on a device operated by the target or the shooter.

Referring now to the virtual weapon chosen, it can have an accuracy and distance corresponding to a real world weapon (actual weapon) based on it having the same name as the real weapon or likeness exhibited on the screen when it is selected (e.g., an "AK-47" can have a virtual representation and real-world statistics in terms of accuracy, distance, and explosive power/size). A weapon can have a small point of damage or do damage over a large area (such as a grenade having a larger damage range, with decreasing amounts of damage, from the impact point than a bullet).

Probability of a hit can further be determined based on movement of the device operated by the shooter, as determined by one of the GPS receiver or accelerometer on the device of the shooter in a time period before the shot. Such movement might indicate fatigue of the shooter, which corresponds to a less accurate shot. Shakiness or jitter of the device while the shot is being made might also decrease accuracy (or cause a different target to be hit).

In a method of carrying out embodiments of the disclosed technology, such as described above, a location of a first hand-held device, using a GPS receiver, is determined, based on the GPS output. (GPS is "global positioning system" or any device which outputs location information.) One points the hand-held device towards a target hand-held device, causing the first hand-held device to have an accelerometer at a specific orientation. A weapon is selected (this step can take place before the prior step), the weapon having an accuracy and maximum distance associated there-with. An indication to fire a shot from the weapon is received from/sent to the first hand-held device, whereby said first hand-held device sends data indicating the selected weapon, the orientation, and a time of the shot.

A target hand-held device can be found, such as by placing an indicium or indicia represented thereof (based on proper aiming/pointing the device there-toward, on a screen of the device of the shooter, before the step of pointing can be carried out. A step of receiving back an indication via the network node that the target has been hit, can be carried out. If not hit, then a closest distance to the target (or other targets) that the shot reached can be displayed. An indication that the shot was blocked by a natural or man-made solid object between the first hand-held device and the target hand-held device can alternatively be displayed.

Any device or step to a method described in this disclosure can comprise, or consist of, that which it is a part of, or the parts which make up the device or step. The term "and/or" is inclusive of the items which it joins linguistically, and each item by itself.

DETAILED DESCRIPTION OF EMBODIMENTS OF THE DISCLOSED TECHNOLOGY

A real-life target is hit with a virtual bullet or projectile, using GPS-enabled or otherwise location-aware devices which report their location. Real world information is taken into account, such as the terrain, elevation, weather, and line of sight, to determine if the virtual bullet hits the real-life target. Virtual information is also taken into account, such as which weapon is selected and what its distance and accuracy are. Further, information about the shooter is taken into account, such as his/her accuracy, how tired he/she is (based on recent travel distance and velocity), and how steady the GPS-enabled device is being held. Thus, a simulation which mirrors reality is made, allowing people to play a more realistic type of a virtual action with each other.

Embodiments of the disclosed technology are described below, with reference to the figures provided.

Figure 1:
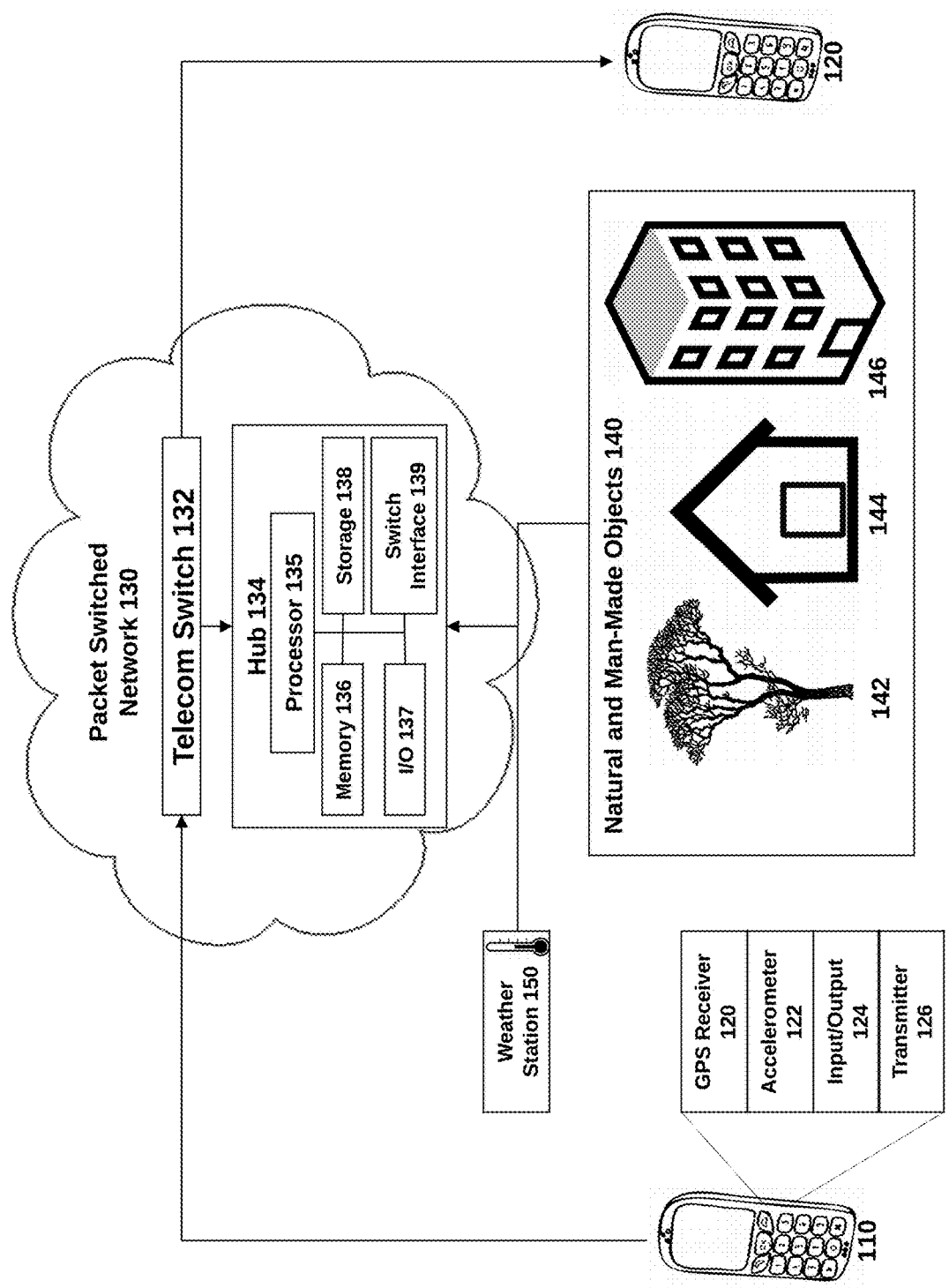
FIG. 1 is a high level block diagram of devices which are used to carry out embodiments of the disclosed technology.

FIG. 1 shows a high level block diagram of devices which are used to carry out embodiments of the disclosed technology. Bi-directional transceivers 110 and 120 are shown. These are devices which generally have displays and receive and send data wirelessly. Hardware processors therein carry out instructions, and any number of additional devices is attached, including likenesses of weapons and input devices. Device 110 will be described as a device operated by a "shooter" (a person firing a virtual shot), and device 120 will be described as a device operated by a "target" (a person being virtually shot). Each has some or all of the following elements: a GPS receiver 120, an accelerometer 122, input/output mechanisms 124, and a transmitter 126.

The GPS (global positioning system) receiver 120 is a global positioning system receiver which receives data from global navigation satellites to determine location, and reports this location information. The accelerometer 122 measures acceleration and, indirectly, distance, based on time at a rate of acceleration. Other location determination devices which can be used include the Internet protocol (IP address) of one the bi-directional transceivers 110 and/or 120, and looking up a location associated with the Internet protocol address. Further, location can be determined based on which cellular tower is used.

The input/output 124 refers to a keyboard, touch screen, display, and the like, used to receive input and send output to a user of the device. A transmitter 126 enables wireless transmission and receipt of data via a packet-switched network, such as packet-switched network 130. This network, in embodiments, interfaces with a telecommunications switch 132 which routes phone calls and data between two of the bi-directional transceivers 110 and 120. Versions of these data, which include portions thereof, can be transmitted between the devices. A "version" of data is that which has some of the identifying or salient information, as understood by a device receiving the information. For example, a GPS receiver 120 may report location data in one format, and a version of these data can be reported via the packet-switched network 130 to a server. Both versions comprise location-identifying data, even if the actual data are different in each case.

Referring to the telecom switch 132, a device and node where data are received and transmitted to another device via electronic or wireless transmission, is connected to a hub 134, such as operated by an entity controlling the methods of use of the technology disclosed herein. This hub has a processor 135 deciding how the bi-directional transceivers 110 and 120 interact with each other, are notified about the presence of one another, or "shoot" one another. This hub 134 further has memory 136 (volatile or non-volatile) for temporary storage of data, storage 138 for permanent storage of data, and input/output 137 (like the input/output 124), and an interface 139 for connecting via electrical connection to other devices.

Still discussing FIG. 1, natural and man-made objects 140 are shown by way of example. Here, a tree 142, house 144, and commercial building 146 are shown. Each of these can be in a path between the shooter 110 and target 120, blocking a shot which would otherwise hit the target 120 from reaching its destination. Thus, it is not enough to simply shoot at the target. Rather, the position of these objects is known by way of incorporating/receiving such data (herein, "map data"), as well as elevation data (elevation of the shooter 110, target 120, and objects 140), in order to determine if the shooter and target can hit each other. In the prior art, this might be accomplished by way of sending an infrared beam, but in the present technology, this is carried out by way of determining a position of all the aforementioned objects.

Bi-directional transceivers 110 and 120 are operated by those who are taking part in a simulation. Each reports its position, orientation, present velocity, elevation, or some parts thereof, based on the use of specialized sensors, such as a GPS receiver 120, accelerometer 122, input 124, and transmitter 126. Based on a determination of map data describing where objects 140 are, it is determined if the shooter 110 can hit the target 120, or is blocked by an object such as a building. Based on information about the weather received in real-time in some embodiments, the path of bullet or accuracy of the shot is adjusted. For example, a bullet travels differently in a higher pressure environment than a lower pressure environment. Temperature and wind also effect how a bullet travels.

Figure 2:
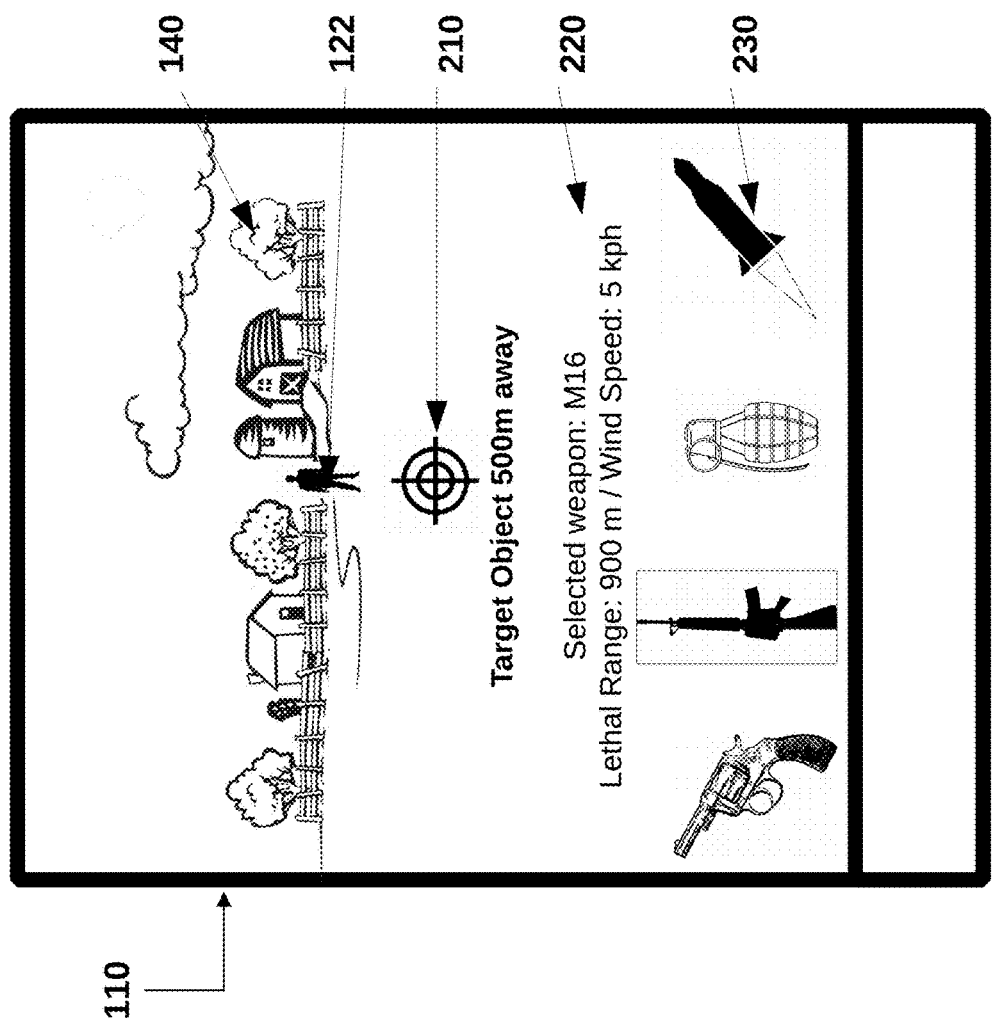
FIG. 2 shows a sample of output on a device operated by a shooter, in an embodiment of the disclosed technology.

FIG. 2 shows a sample of output on a device operated by a shooter, in an embodiment of the disclosed technology. Objects 140 are all around a target 122. In this case, for the sake of simplicity, the target is shown standing in front of the objects in an open field. On the display, a shooter can select a weapon 230, and information about this weapon is displayed. Here, an M16 with a lethal range of 900 meters is selected and, in this embodiment, the distance of the target 122 is shown (500 m). At present, there is a clear line of sight, but if the person/target 122 ducks behind the silo or tree, the line of sight can be lost, and this will be known, based on importing topographic map data; as such, the target 122 could not be hit by the shooter 110. Further, weather information is taken into account as such in the text 220, which includes wind speed in some embodiments. Thus, the shooter might adjust for the wind, as one would ordinarily when there is wind and shooting at a distance. Cross-hairs 210 might be displayed on a display device (such as a scope or bi-directional transceiver) to help the shooter take aim. With this picture in mind, FIG. 3 will now be described, explaining the details of the method which takes place from the shooter's perspective as well as from an operator's perspective.

Figure 3:
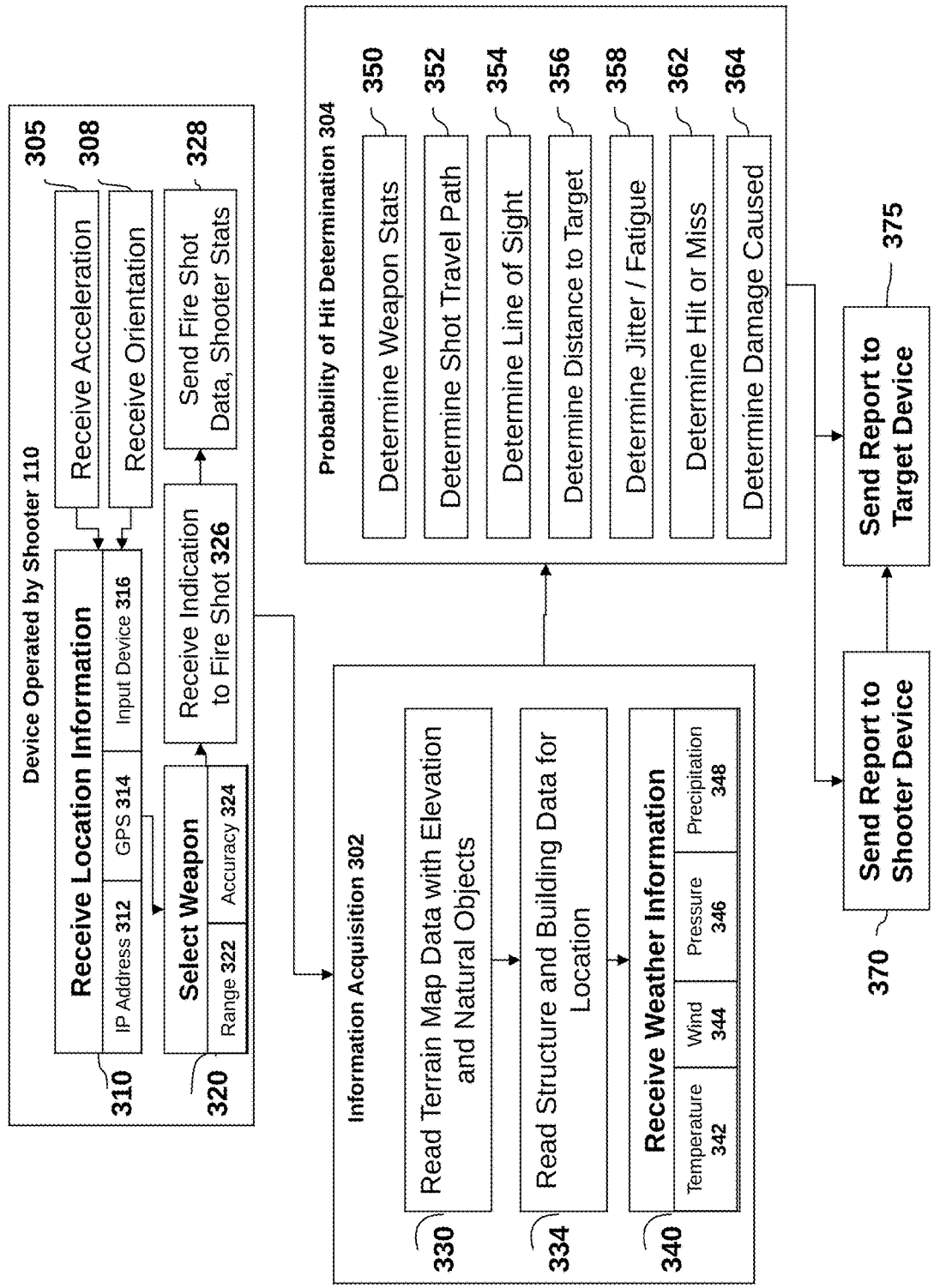
FIG. 3 shows a high-level flow chart of steps carried out during embodiments of the disclosed technology.

FIG. 3 shows a high-level flow chart of steps carried out during embodiments of the disclosed technology. At the device operated by the shooter 110, various kinds of information are acquired. Acceleration 305 information is acquired, such as from an accelerometer or GPS receiver (which can be used in step 356, determining distance to target, determining jitter/fatigue (step 358), and so forth).

Orientation 308 information is further acquired, such as from the accelerometer, GPS, or a compass (which can be used to determine the travel path in step 352, line of sight in step 354, and so forth). Location information 310 is received, such as by way of a person's IP address 312 (e.g., an IP address associated with Parsippany, N.J., limits processing to targets in Morris County, N.J.), GPS 314, or other input devices 316, such as laser site guides or the like. Once the location is determined along with the orientation, or before same, the shooter 110 selects a weapon in step 320. Such a weapon has a pre-determined range 322 and accuracy 324. This can also include splash damage and damage distance, and decrease in value from a point of impact.

The shooter then indicates that he/she wants to shoot in step 326, such as by selecting a button, a display on the device he/she is operating, or a trigger on a gun or other device which is electrically coupled to a transmitting device. These fire shot data and the shooter stats are transmitted via a packet-switched network in step 328. It should be understood that these steps (326 and 328) can take place after, before, or concurrent with, steps 305-324, or some before and some after. The shooter's stats may be inputted from his/her data acquired from real shooting competitions, or shooting events, or that of others who have shot the selected weapon of step 320. In this manner, one can pretend to shoot as, say, a professional sniper or a brother who wins shooting competitions in Arizona. Or, the shooter stats might be based on previous attempts to shoot virtual bullets and virtual weapons in other such simulations.

External information about the relative location is determined or acquired in the information acquisition block 302. This can take place before, concurrent with, or after steps 305-328. Terrain map data with elevation and natural objects in red in step 330, while structural and building data are read in step 334 to determine what is between the shooter and target or targets, as well as how these items might affect the shot. On high wind days, for example, a wind tunnel is often created between skyscrapers, causing much stronger wind and more difficult—or even nearly impossible—shots to be made. Elevation, where the shooter is above the target, might make accuracy greater, whereas the opposite might make it lower. Further, weather information is received in step 340, such as from a weather station. This can include temperature 342, wind 344, pressure 346, and precipitation 348, all of which can affect the path of a bullet and accuracy of the shooter. For example, the shooter or weapon may not function well below a certain temperature. This can be taken into account when determining the path of the bullet, where it hits, and if it escapes the weapon at all.

Finally, all of the prior data are used in box 304, comprising a series of steps to determine if the bullet hits a target. Based on the selected weapon in step 320, its stats are determined in step 350, such as how likely it is to jam, how far it can shoot, how far it typically shoots, how large an impact it makes, how much damage it does from the impact point, and the like. A shot travel path in step 352 can be determined. This can be based on the orientation of the shooter, as well as the angle of the shot (based on output of an accelerometer). Once the path of bullet travel is known, it can be determined if this bullet will hit a target or if it is being blocked by an object, in step 354. Line of sight determination has been described more fully with reference to FIGS. 1 and 2 above. A distance to a target is also determined, in some embodiments, in step 356. Some or all of these factors help determine if the bullet will reach a target.

Accuracy of the shot can also depend on the state of the shooter. Someone who is more rested typically can shoot more accurately. Someone who is running from zombies, in a simulation, and has, in reality, just run about a kilometer and is trying to turn around and fire while running, is not going to be as accurate with his/her shot. Therefore, in embodiments, based on prior travel data received from a GPS 314, prior and current acceleration data received in step 305, and changes in orientation received in step 308, it can be determined how tired the shooter likely is at the present moment, and how much the device is shaking, moving, or making abrupt turns. All such actions in real life can affect a shot. For example, while at the moment of the shot the device might be facing at a particular orientation, if a gun were rotating transverse to the shot while shooting, the bullet path would be affected accordingly. Thus, to compensate for the digital last moment output and make it more like a "more messy" real world gun movement, the shot path is determined not only on the precise moment of the shot, but also on movement just prior to the shot.

Using the above data, in step 362 it is finally determined if the shot hit or missed a target and the amount of damage caused (step 364), even if the shot "missed" but hit close. Reports or information can then be sent to the shooter's device (step 370) and/or the target device (step 375) stating, for example, how close the shot was to hitting the target, or simply that it did hit, miss, or did a certain amount of damage, or even killed the target.

Figure 4:
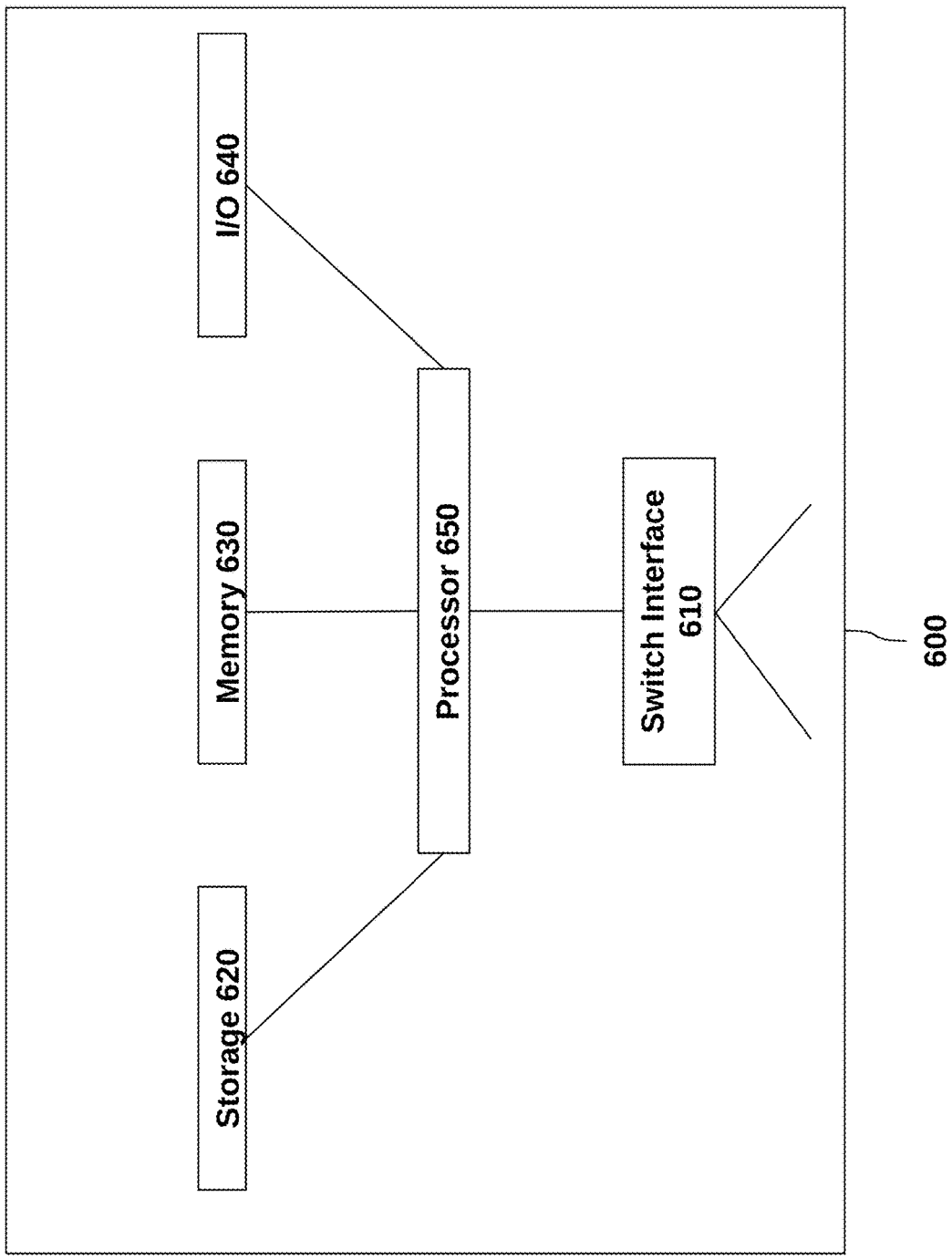
FIG. 4 shows a high-level block diagram of a device that may be used to carry out the disclosed technology.

FIG. 4 shows a high-level block diagram of a device that may be used to carry out the disclosed technology. Device 600 comprises a processor 650 that controls the overall operation of the computer by executing the device's program instructions which define such operation. The device's program instructions may be stored in a storage device 620 (e.g., magnetic disk, database) and loaded into memory 630, when execution of the console's program instructions is desired. Thus, the device's operation will be defined by the device's program instructions stored in memory 630 and/or storage 620, and the console will be controlled by processor 650 executing the console's program instructions. A device 600 also includes one, or a plurality of, input network interfaces for communicating with other devices via a network (e.g., the internet). The device 600 further includes an electrical input interface. A device 600 also includes one or more output network interfaces 610 for communicating with other devices. Device 600 also includes input/output 640, representing devices which allow for user interaction with a computer (e.g., display, keyboard, mouse, speakers, buttons, etc.). One skilled in the art will recognize that an implementation of an actual device will contain other components as well, and that FIG. 4 is a high level representation of some of the components of such a device, for illustrative purposes. It should also be understood by one skilled in the art that the method and devices depicted in FIGS. 1 through 3 may be implemented on a device such as is shown in FIG. 4.

Further, it should be understood that all subject matter disclosed herein is directed, and should be read, only on statutory, non-abstract subject matter. All terminology should be read to include only the portions of the definitions which may be claimed. By way of example, "computer readable storage medium" is understood to be defined as only non-transitory storage media.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

I claim:

1. A system for determining if a target has been hit, comprising:
   receiving, via a first packet-switched network, location information determined by a GPS receiver on a device operated by a shooter;
   receiving, via a second packet-switched network, location information determined by a GPS receiver on a device operated by a target;
   reading map data comprising both real and man-made terrain elements;
   receiving data from said device operated by said shooter indicating a shot;
   determining a probability of said shooter hitting said target with said shot based on, at least:
      if said target is in a line of sight to said shooter;
      elevation of said target compared to said shooter; and
      a distance between said shooter and said target, said distance calculated from said location information received from said device operated by said shooter, and said device operated by said target.

2. The system of claim 1, further comprising sending a notification to said device operated by said shooter, and said device operated by said target, of a closest distance that said shot came to said location of said device operated by said target.

3. The system of claim 1, wherein said probability is further determined by an angle of said device operated by said shooter, said angle outputted by an accelerometer in said device of said shooter.

4. The system of claim 3, wherein said probability is further determined by an orientation of said device operated by said shooter, said orientation determined based on output by said accelerometer and said GPS receiver in said device of said shooter.

5. The system of claim 1, wherein said probability is further determined, based on both a range and accuracy of a weapon selected for said shot.

6. The system of claim 5, wherein said probability is further determined based on jitter of said device operated by said shooter at a time of said shot.

7. The system of claim 5, wherein said probability of hitting an unblocked said target is further based on a difference in elevation between said shooter and said target.

8. A method for determining if a target has been hit, comprising:
   determining location of a first hand-held device using a GPS receiver;
   pointing said hand-held device towards a target hand-held device causing said first hand-held device to have an accelerometer at a specific orientation;
   selecting a weapon, said weapon having an accuracy and maximum distance associated there-with;
   sending in an indication to fire a shot from said weapon to said first hand-held device, whereby said first hand-held device sends data indicating said selected weapon, said orientation, and a time of said shot;
   receiving a notification of a closest distance that said shot came to hitting said target.

9. The method of claim 8, further comprising finding a target hand-held device before said step of pointing.

10. The method of claim 9, further comprising receiving back an indication via said network node that said target has been hit.

11. The method of claim 9, further comprising receiving back an indication of closest distance that said shot reached said target.

* * * * *